United States Patent
Couillard et al.

(10) Patent No.: US 12,319,030 B2
(45) Date of Patent: Jun. 3, 2025

(54) ASYMMETRICAL GLASS LAMINATES HAVING COMPOSITE INTERLAYER AND RELATED METHODS

(71) Applicant: Corning Incorporated, Corning, NY (US)

(72) Inventors: James Gregory Couillard, Ithaca, NY (US); Michael Aaron McDonald, Painted Post, NY (US); Paul George Rickerl, Endicott, NY (US)

(73) Assignee: CORNING INCORPORATED, Corning, NY (US)

( * ) Notice: Subject to any disclaimer, the term of this patent is extended or adjusted under 35 U.S.C. 154(b) by 74 days.

(21) Appl. No.: 17/777,455

(22) PCT Filed: Nov. 20, 2020

(86) PCT No.: PCT/US2020/061425
§ 371 (c)(1),
(2) Date: May 17, 2022

(87) PCT Pub. No.: WO2021/102218
PCT Pub. Date: May 27, 2021

(65) Prior Publication Data
US 2024/0009965 A1    Jan. 11, 2024

Related U.S. Application Data

(60) Provisional application No. 62/938,715, filed on Nov. 21, 2019.

(51) Int. Cl.
*B32B 5/16*    (2006.01)
*B32B 17/10*    (2006.01)

(52) U.S. Cl.
CPC .... *B32B 17/10036* (2013.01); *B32B 17/1077* (2013.01); *B32B 17/10779* (2013.01);
(Continued)

(58) Field of Classification Search
CPC ........ B32B 17/10036; B32B 2307/732; B32B 2307/7376; B32B 2250/05
See application file for complete search history.

(56) References Cited

U.S. PATENT DOCUMENTS 6,327,954 B1    12/2001    Medlin
6,576,342 B1    6/2003    Cerf et al.
(Continued)

FOREIGN PATENT DOCUMENTS

CN    1476381 A    2/2004
CN    107614823 A    1/2018
(Continued)

OTHER PUBLICATIONS

European Patent Application No. 20890598.4, Extended European Search Report dated Nov. 8, 2023, 7 pages, European Patent Office.
(Continued)

*Primary Examiner* — Hoa (Holly) Le
(74) *Attorney, Agent, or Firm* — Daniel J. Greenhalgh

(57) ABSTRACT

Various embodiments for a laminate glass article and related methods are provided. The laminated glass article includes a first and second glass layers with an interlayer positioned therebetween, comprising: a polymer core layer comprising a high modulus polymer (e.g. polyethylene terephthalate, polycarbonate, polyacrylate, and polyimide); a first low modulus material layer (e.g. first TPU or first PVB or first EVA) configured between the first layer and the polymer core layer; and a second low modulus material layer (e.g. second TPU or second PVB or second EVA) configured between the second layer and the polymer core layer.

20 Claims, 5 Drawing Sheets

(52) U.S. Cl.
CPC ............... *B32B 17/10788* (2013.01); *B32B 2307/7376* (2023.05); *B32B 2315/08* (2013.01); *B32B 2329/06* (2013.01); *B32B 2331/04* (2013.01); *B32B 2367/00* (2013.01); *B32B 2375/00* (2013.01)

(56) References Cited

U.S. PATENT DOCUMENTS

| | | | |
|---|---|---|---|
| 2005/0106372 A1 | 5/2005 | Moran et al. | |
| 2012/0068083 A1 | 3/2012 | Labrot et al. | |
| 2015/0064374 A1 | 3/2015 | Jain et al. | |
| 2016/0193812 A1* | 7/2016 | Couillard | B32B 7/027 156/60 |
| 2017/0087964 A1* | 3/2017 | Nakamura | B32B 17/10761 |
| 2017/0320297 A1* | 11/2017 | Bennison | B32B 17/00 |
| 2017/0361592 A1* | 12/2017 | Karagiannis | B32B 3/263 |
| 2018/0345644 A1 | 12/2018 | Kang et al. | |
| 2019/0002328 A1 | 1/2019 | Lezzi et al. | |
| 2019/0002330 A1 | 1/2019 | Lezzi et al. | |
| 2019/0270284 A1 | 9/2019 | Couillard et al. | |
| 2019/0315099 A1 | 10/2019 | Baby et al. | |
| 2020/0180275 A1* | 6/2020 | Fisher | B32B 17/10743 |

FOREIGN PATENT DOCUMENTS

| | | | |
|---|---|---|---|
| CN | 108349230 A | 7/2018 | |
| JP | 2005-017918 A | 1/2005 | |
| JP | 2005-019082 A | 1/2005 | |
| KR | 10-1238214 B1 | 3/2013 | |
| WO | WO-2017200053 A1 * | 11/2017 | ............. B32B 17/10 |

OTHER PUBLICATIONS

International Search Report and Written Opinion of the International Searching Authority; PCT/US2020/061160; mailed on Mar. 18, 2021, 11 pages; Korean Patent Office.
International Search Report and Written Opinion of the International Searching Authority, PCT/US2020/061425; mailed on Mar. 18, 2021, 12 pages; Korean Patent Office.
Corning (R) Eagle XG (R) glass product information sheet. Obtained from Corning.com on Apr. 5, 2023. (Year: 2021), 2 pages.
Chinese Patent Application No. 202080091337.1, Office Action, dated Mar. 8, 2023, 9 pages, Chinese Patent Office.

* cited by examiner

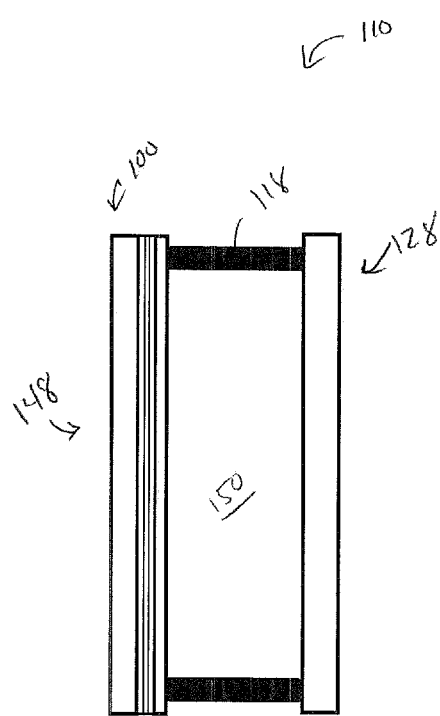 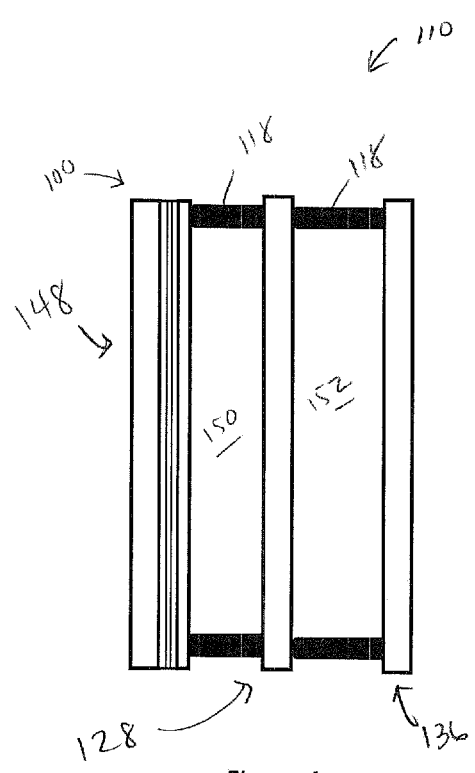
Figure 3                    Figure 4

ASYMMETRICAL GLASS LAMINATES HAVING COMPOSITE INTERLAYER AND RELATED METHODS

CROSS REFERENCE TO RELATED APPLICATIONS

This application claims the benefit of priority under 35 U.S.C. § 371 of International Application No. PCT/US2020/061425, filed on Nov. 20, 2020, which claims the benefit of priority under 35 U.S.C. § 119 of U.S. Provisional Application No. 62/938,715 filed Nov. 21, 2019, the content of each of which is incorporated herein by reference in its entirety.

FIELD OF THE INVENTION

Generally, the present disclosure is directed towards various embodiments of asymmetrical laminates with reduced bow. More specifically, the present disclosure is directed towards various embodiments of asymmetrical laminates (e.g. thickness and CTE mismatch) having a multi-layered interlayer of low modulus/high strength/low modulus interlayer materials, wherein the laminate is configured with bow mitigation (e.g. for large dimensioned windows, a surface area of at least 3 feet by 5 feet).

In one non-limiting example, the present disclosure is directed towards various embodiments asymmetrical laminates (e.g. thickness and CTE mismatch) having a multi-layered interlayer of TPU-PET-TPU, wherein the laminate is configured with bow mitigation (e.g. for large dimensioned windows, a surface area of at least 3 feet by 5 feet).

In another non-limiting example, the present disclosure is directed towards various embodiments asymmetrical laminates (e.g. thickness and CTE mismatch) having a multi-layered interlayer of low modulus PVB-PET-low modulus PVB, wherein the laminate is configured with bow mitigation (e.g. for large dimensioned windows, a surface area of at least 3 feet by 5 feet).

In another non-limiting example, the present disclosure is directed towards various embodiments asymmetrical laminates (e.g. thickness and CTE mismatch) having a multi-layered interlayer of low modulus EVA-PET-low modulus EVA, wherein the laminate is configured with bow mitigation (e.g. for large dimensioned windows, a surface area of at least 3 feet by 5 feet).

In some embodiments, the first low modulus layer and second low modulus layer are the same material (e.g. TPU, EVA, or PVB). In some embodiments, the first low modulus layer and second low modulus layer are different materials (e.g. TPU, EVA, or PVB).

In one example, the first low modulus material layer is TPU and the second low modulus material layer is PVB. In another example, the first low modulus material is PVB and the second low modulus material layer is TPU.

In one example, the first low modulus material layer is TPU and the second low modulus material layer is EVA. In another example, the first low modulus material is EVA and the second low modulus material layer is TPU.

In one example, the first low modulus material layer is EVA and the second low modulus material layer is PVB. In another example, the first low modulus material is PVB and the second low modulus material layer is EVA.

Laminates having different glass compositions with differing coefficients of thermal expansion can undergo significant bowing, which makes mounting bowed laminates in planar window frames and insulating glass units impractical or impossible beyond a certain size. Laminates with asymmetrical CTE mismatch and having improved bow resistance are desired.

SUMMARY OF THE INVENTION

Broadly, the present disclosure is directed towards a material combination and method for reducing bow in glass-glass laminates, wherein the two glass sheets are of dissimilar coefficients of expansion (CTE), while also retaining impact resistance performance. As disclosed in one or more embodiments, the composite interlayer provides multiple, tailored advantages: the bow reduction is achieved by utilizing a low-modulus (as determined by elastic modulus) material (e.g. thermoplastic polyurethane (TPU) or PVB) as an interlayer component of the laminate, while impact resistance/performance is enhanced with the utilization of a tough polymer film (e.g. PET, polycarbonate, acrylic, or polyimide) configured between two low modulus layer(s). With bow reduction/mitigation laminate embodiments detailed herein, the laminates and/or windows are believed to have: improved long-term reliability, improved manufacturability, improved IGU construction, improved performance of impact resistant windows, wider thickness variation between the two glass sheets of differing CTE, among other advantages.

In one aspect, a laminate glass article is provided. The laminate glass article includes: a first layer of a first transparent or translucent material, the first sheet having a thickness and a first coefficient of thermal expansion (CTE) measured over a range of from 0-300° C.; a second layer of a second transparent or translucent material, the second sheet having a thickness and a second CTE; and an interlayer between the first layer and the second layer, wherein the interlayer is adhered between the first layer and the second layer; wherein the interlayer comprises a plurality of polymer layers, including: a polymer core layer comprising a high modulus polymer (e.g. selected from non-limiting examples including: polyethylene terephthalate, polycarbonate, polyacrylate, and polyimide); and a first low modulus material layer (first low modulus layer) configured between the first layer and the polymer core layer; and a second low modulus material layer (second low modulus layer) configured between the second layer and the polymer core layer.

In one aspect, a laminate glass article is provided. The laminate glass article includes: a first layer of a first transparent or translucent material, the first sheet having a thickness and a first coefficient of thermal expansion (CTE) measured over a range of from 0-300° C.; a second layer of a second transparent or translucent material, the second sheet having a thickness and a second CTE; and an interlayer between the first layer and the second layer, wherein the interlayer is adhered between the first layer and the second layer; wherein the interlayer comprises a plurality of polymer layers, including: a polymer core layer comprising a high modulus polymer (e.g. selected from non-limiting examples including: polyethylene terephthalate, polycarbonate, polyacrylate, and polyimide); and a first thermoplastic urethane layer (first TPU) configured between the first layer and the polymer core layer; and a second thermoplastic urethane layer (second TPU) configured between the second layer and the polymer core layer.

In one aspect, a laminate glass article is provided. The laminate glass article includes: a first layer of a first transparent or translucent material, the first sheet having a thickness and a first coefficient of thermal expansion (CTE)

measured over a range of from 0-300° C.; a second layer of a second transparent or translucent material, the second sheet having a thickness and a second CTE; and an interlayer between the first layer and the second layer, wherein the interlayer is adhered between the first layer and the second layer; wherein the interlayer comprises a plurality of polymer layers, including: a polymer core layer comprising a high modulus polymer (e.g. selected from non-limiting examples including: polyethylene terephthalate, polycarbonate, polyacrylate, and polyimide); and a first low modulus PVB layer (first PVB) configured between the first layer and the polymer core layer; and a second low modulus PVB layer (second PVB) configured between the second layer and the polymer core layer.

In some embodiments, the high modulus polymer is selected from the group consisting of: polyethylene terephthalate, polycarbonate, polyacrylate, polyimide, and combinations thereof.

In some embodiments, the polymer comprises a polyester.

In one embodiment, the interlayer has a thickness of not greater than 2.5 mm.

In one embodiment, the article has a surface area (e.g. areal size) greater than 3'×5' comprises of bow of not greater than 1.5 mm/m when measured in accordance with ASTM C1172.

In one embodiment, the article has a surface area (e.g. areal size) greater than 3'×5' comprises of bow of not greater than 2.3 mm/m when measured in accordance with ASTM C1172.

In one embodiment, the article has a surface area (e.g. areal surface) greater than 3'×5' comprises of bow of not greater than 3 mm/m when measured in accordance with ASTM C1172.

In one embodiment, the article has a surface area (e.g. areal size) greater than 6'×10' comprises of bow of not greater than 1.5 mm/m when measured in accordance with ASTM C1172.

In one embodiment, the article has a surface area (e.g. areal size) greater than 6'×10' comprises of bow of not greater than 2.3 mm/m when measured in accordance with ASTM C1172.

In one embodiment, the article has a surface area (e.g. areal surface) greater than 6'×10' comprises of bow of not greater than 3 mm/m when measured in accordance with ASTM C1172.

In one embodiment, the article has a surface area (e.g. areal size) greater than 7'×12' comprises of bow of not greater than 1.5 mm/m when measured in accordance with ASTM C1172.

In one embodiment, the article has a surface area (e.g. areal size) greater than 7'×12' comprises of bow of not greater than 2.3 mm/m when measured in accordance with ASTM C1172.

In one embodiment, the article has a surface area (e.g. areal surface) greater than 7'×12' comprises of bow of not greater than 3 mm/m when measured in accordance with ASTM C1172.

In one embodiment, the first CTE is greater than the second CTE.

In one embodiment, the first CTE is 2.5 times greater than the second CTE.

In one embodiment, the first CTE is greater than $75 \times 10^{-7}$/° C.

In one embodiment, the second CTE is less than $60 \times 10^{-7}$/° C.

In one embodiment, the thickness of the first layer is greater than the thickness of the second layer.

In one embodiment, the second layer comprises a thickness of not greater than 1 mm.

In one embodiment, the second layer comprises a thickness in the range from 0.3 mm to 1 mm.

In one embodiment, the first layer is a soda lime silicate glass.

In one embodiment, the second layer is an inorganic glass.

In one embodiment, the second layer is an alkaline earth boro-aluminosilicate glass.

In one embodiment, the interlayer comprises a thickness of 0.76 mm to 2.3 mm.

In one embodiment, the polymer core has a thickness that is not greater than the thickness of the second layer.

In one embodiment, the polymer core has a thickness that is not greater than half of the thickness of the second layer.

In one embodiment, the first low modulus material layer and the second low modulus material layer are selected from the following thicknesses: 0.38 mm, 0.635 mm, 0.76 mm, and 1.27 mm.

In one embodiment, the first TPU layer and the second TPU layer are selected from the following thicknesses: 0.38 mm, 0.635 mm, 0.76 mm, and 1.27 mm.

In one embodiment, the first low modulus PVB layer and the second low modulus PVB layer are selected from the following thicknesses: 0.38 mm, 0.635 mm, 0.76 mm, and 1.27 mm, and 1.42 mm.

In one embodiment, the core polymer layer (e.g. PET) has a thickness that is selected from the group consisting of: 0.025 mm, 0.051 mm, 0.076 mm, 0.102 mm, 0.127 mm, and 0.178 mm.

In one embodiment, the interlayer has a thickness of approximately 0.785 mm, wherein the polymer core (e.g. PET) is 0.025 mm thick and the combined thicknesses of the first layer of low modulus material (e.g. TPU or PVB) and the second layer of low modulus material (e.g. TPU or PVB) are not greater than 0.38 mm.

In one embodiment, interlayer has a thickness of 2.29 mm, wherein the polymer core (e.g. PET) is 0.7 mm thick and the combined thicknesses of the first layer of low modulus material (e.g. TPU or PVB) and the second layer of low modulus material (e.g. TPU or PVB) are not greater than 1.52 mm.

In one embodiment, the interlayer has a thickness of approximately 1.55 mm, wherein the polymer core (e.g. PET) is 0.025 mm thick and the combined thicknesses of the first layer of TPU and the second layer of TPU are not greater than approximately 1.52 mm.

In one embodiment, interlayer has a thickness of 2.29 mm, wherein the polymer core (e.g. PET) is 0.7 mm thick and the combined thicknesses of the first layer of TPU and the second layer of TPU are not greater than 1.52 mm.

In one embodiment, a total thickness of the first layer is between 2 mm and 12 mm.

In one embodiment, a total thickness of the first layer is between 3 mm and 6 mm.

In one embodiment, a total thickness of the first layer is between 2 mm and 7 mm.

In one embodiment, the thickness of first layer is not greater than 12 mm, the thickness of second layer not greater than 1 mm, and the thickness of the interlayer not greater than 2.5 mm.

In one embodiment, the thickness of first layer is not greater than 6 mm, the thickness of second layer is not greater than 1 mm, and the thickness of the interlayer is not greater than 2 mm.

In one embodiment, the thickness of the first layer is not greater than 6 mm, the thickness of the second layer is not greater than 1 mm, and the thickness of the interlayer is not greater than 1.5 mm.

In one embodiment, the interlayer thickness ranges from 0.76 mm to 2.5 mm.

In one embodiment, the thickness of the laminate is not greater than 15.3 mm.

In one embodiment, the thickness of the laminate ranges from 4.25 mm to 8 mm.

In one embodiment, the thickness of the laminate is not greater than 6.5 mm.

In one embodiment, the thickness of the laminate ranges from 5 mm to 7 mm.

In one embodiment, the thickness of the laminate is not greater than 4.5 mm.

In one embodiment, the article is a (e.g. qualifies as) safety glazing material, when measured in accordance with ANSI Z97.1 (Safety glazing).

In one embodiment, the article is resistant to hard body impact, when measured in accordance with EN 356 (security glazing).

In one embodiment, the article is a (e.g. qualifies as a) safety glazing material, when measured in accordance with EN 12600 (safety glazing).

In one embodiment, the article is resistant to missile impact or cyclic pressure differentials, when measured in accordance with at least one of: Miami-Dade TAS201, 202, or 203.

In one embodiment, the article is resistant to missile impact or cyclic pressure differentials, when measured in accordance with at least one of: ASTM E1233, ASTM E1886, or ASTM 1996.

In one embodiment, the article is hurricane resistant, when measured in accordance with AAMA 506.

In one embodiment, the article comprises a large dimensioned size (e.g. surface area) of at least 3'×5'; at least 5'×10'; at least 7'×10'; or at least 6'×12'.

In one embodiment, the article comprises a large dimensioned size (e.g. surface area) of at least 10'×12'.

In one embodiment, the article comprises an architectural product.

In one embodiment, the article comprises a window.

In one embodiment, the article comprises a window, a skylight, a curtain wall, a balcony rail, or an automotive window.

In one embodiment, the article comprises a window including a frame.

In one embodiment, the article comprises a window including a plurality of panes, wherein the plurality of panes is positioned in space relation to one another with a seal member, such that an air gap is defined via the seal member, and the plurality of panes.

In some embodiments, in a triple pane window, the seal between the first pane and the second pane are integral (e.g. the same seal member, same material). In some embodiments, in a triple pane window, the seal between the first pane and the second pane are discrete components. For example, the seals between each set of panes may be of the same material and configuration, or different material and/or configuration.

In some embodiments, in a quadruple pane window, the seal between the first pane and the second pane (e.g. first seal area), the second pane and the third pane (e.g. second seal area), and the third pane and the fourth pane (e.g. third seal area) are integral (e.g. the same seal member). In some embodiments, in a quadruple pane window, the first seal area, the second seal area, and the third seal area comprise discrete components (e.g. separate seal members). Also, when the seal members are discrete seal members, at least one of the seal members is different from the other two, or all three seal members could be different (e.g. based on material and/or configuration).

In one embodiment, the air gap is configured to retain an insulating gas.

In one embodiment, the article comprises a double pane window.

In one embodiment, the double pane window is configured with a laminate.

In one embodiment, the article comprises a double pane window that includes a first laminate as a first pane and a second laminate as a second pane.

In one embodiment, the article comprises a triple pane window.

In one embodiment, the article comprises a triple pane window that includes a first laminate as a first pane, a second pane, and a third pane comprising a second laminate.

In one embodiment, the article comprises a quadruple pane window.

In one embodiment, the article comprises a quadruple pane window that includes a first laminate as a first pane, a second pane, a third pane, and a second laminate comprising a fourth pane.

In another aspect, a method is provided. The method includes the steps of: positioning a plurality of interlayer components, including a core layer, a first low modulus material layer (e.g. TPU or PVB or EVA), and a second low modulus material layer (e.g. TPU or PVB or EVA), where the core layer is configured between a first low modulus layer and a second low modulus layer, between a first layer of glass and a second layer of glass to form a stack; removing any entrapped air from the respective layers in the stack to form a curable stack; and curing the curable stack at an elevated temperature sufficient to cure the stack to form a monolithic laminate structure. When curing PVB or EVA, the curing temperature is approximately 130 to 140 degrees C., while a lower temperature will sufficiently cure for TPU (e.g. not exceeding about 105 degrees Celsius).

In another aspect, a method is provided. The method includes the steps of: positioning a plurality of interlayer components, including a core layer, a first TPU layer, and a second TPU layer, where the core layer is configured between a first TPU layer and a second TPU layer, between a first layer of glass and a second layer of glass to form a stack; removing any entrapped air from the respective layers in the stack to form a curable stack; and curing the curable stack at an elevated temperature not exceeding about 105 degrees Celsius to form a monolithic laminate structure.

In one embodiment, the monolithic laminate has a thickness not exceeding 6 mm.

In one embodiment, the monolithic laminate has a thickness not exceeding 15 mm.

In one embodiment, the monolithic laminate has a thickness not exceeding 10 mm.

In one embodiment, the removing step further comprises applying mechanical vacuum to the stack to form a curable stack.

In one embodiment, the removing step further comprises nip rolling the stack to form a curable stack.

In another aspect, a method is provided. The method includes the steps of: configuring an insulating glazing unit (IGU) in a fenestration opening, the insulating glazing unit comprising: at least one pane comprising a laminate glass article, the laminate glass article including: a first layer of a first transparent or translucent material, the first sheet having a first thickness and a first coefficient of thermal expansion (CTE) measured over a range of from 0-300° C.; a second layer of a second transparent or translucent material, the second sheet having a second thickness and a second CTE; an interlayer between the first layer and the second layer, wherein the interlayer is adhered between the first layer and the second layer; wherein the interlayer comprises a plurality of polymer layers, including: a core polymer layer comprising high modulus polymer (e.g. non-limiting examples including: polyethylene terephthalate, polycarbonate, polyacrylate, and polyimide); and a first low modulus material layer (e.g. first TPU or first PVB) configured between the first layer and the core layer; and a second low modulus material layer (e.g. second TPU or a second PVB) configured between the second layer and the core layer; and installing the IGU with a frame to provide a window.

In another aspect, a method is provided. The method includes the steps of: configuring an insulating glazing unit (IGU) in a fenestration opening, the insulating glazing unit comprising: at least one pane comprising a laminate glass article, the laminate glass article including: a first layer of a first transparent or translucent material, the first sheet having a first thickness and a first coefficient of thermal expansion (CTE) measured over a range of from 0-300° C.; a second layer of a second transparent or translucent material, the second sheet having a second thickness and a second CTE; an interlayer between the first layer and the second layer, wherein the interlayer is adhered between the first layer and the second layer; wherein the interlayer comprises a plurality of polymer layers, including: a core polymer layer comprising high modulus polymer (e.g. non-limiting examples including: polyethylene terephthalate, polycarbonate, polyacrylate, and polyimide); and a first thermoplastic urethane layer (first TPU) configured between the first layer and the core layer; and a second thermoplastic urethane layer (second TPU) configured between the second layer and the core layer; and installing the IGU with a frame to provide a window.

In some embodiments, the high modulus polymer is selected from the group consisting essentially of: polyethylene terephthalate (PET), polycarbonate, polyacrylate, polyimide, and combinations thereof.

In some embodiments, the polyester is PET.

In one embodiment, the method comprises, before the installing step, removing a window from a fenestration surface to provide a fenestration opening.

In one embodiment, the IGU has a surface are of at least 3 feet by 5 feet.

In one embodiment, a laminate glass article is provided, comprising: a first layer of a first transparent or translucent material, the first sheet having a first thickness and a first coefficient of thermal expansion (CTE) measured over a range of from 0-300° C. and a first thickness; a second layer of a second transparent or translucent material, the second sheet having a second thickness and a second CTE; and a low modulus material layer as interlayer (e.g. TPU or PVB) between the first layer and the second layer, wherein the low modulus material interlayer is adhered between the first layer and the second layer.

In one embodiment, a laminate glass article is provided, comprising: a first layer of a first transparent or translucent material, the first sheet having a first thickness and a first coefficient of thermal expansion (CTE) measured over a range of from 0-300° C. and a first thickness; a second layer of a second transparent or translucent material, the second sheet having a second thickness and a second CTE; and a thermoplastic urethane interlayer (TPU) between the first layer and the second layer, wherein the TPU interlayer is adhered between the first layer and the second layer.

In some embodiments, the first and second outer layers of the interlayer is configured with a low modulus material (i.e. Young's modulus E for loading duration 1 min at 20 degrees C.). In some embodiments, the interlayer comprises a Young's modulus E of not greater than 25 MPa to not less than 1 MPa. In some embodiments, the interlayer comprises a Young's modulus E of not greater than 20 MPa to not less than 1 MPa. In some embodiments, the interlayer comprises a Young's modulus E of not greater than 15 MPa to not less than 2 MPa. In some embodiments, the interlayer comprises a Young's modulus E of not greater than 13 MPa to not less than 2 MPa. In some embodiments, the interlayer comprises a Young's modulus E of not greater than 11 MPa to not less than 3 MPa. In some embodiments, the interlayer comprises a Young's modulus E of not greater than 8 MPa to not less than 1 MPa. In some embodiments, the interlayer comprises a Young's modulus E of not greater than 7 MPa to not less than 1 MPa. In some embodiments, the interlayer comprises a Young's modulus E of not greater than 7 MPa to not less than 2 MPa. In some embodiments, the interlayer comprises a Young's modulus E of not greater than 5 MPa to not less than 3 MPa. In some embodiments, the interlayer comprises a Young's modulus E of not greater than 4 MPa to not less than 1 MPa. In some embodiments, the interlayer comprises a Young's modulus E of not greater than 5 MPa to not less than 2 MPa. In some embodiments, the interlayer comprises a Young's modulus E of not greater than 5 MPa to not less than 3 MPa. One way to determine Young's modulus of elongation is to evaluate in accordance with ASTM D-882.

Some non-limiting examples of low modulus material layers that can be utilized in accordance with one or more embodiments of the present disclosure include: Ethylene vinyl acetate (EVA); low modulus polyvinyl butyral (PVB) materials; Saflex Clear (PVB); Trosifol Clear (PVB); Trosifol SC (PVB); and TPU.

In some embodiments, the polymer core comprises a tough polymer film (e.g. PET, polycarbonate, acrylic, or polyimide). In some embodiments, the polymer core comprises a high modulus polymer, having a high Young's modulus of elongation, as measured in accordance with ASTM D-882. As a non-limiting example, high modulus means, greater than about 1 GPa, for example at least 2 or more GPA, such as 4 GPa (e.g. materials like PET, PC, and acrylic), when measured in accordance with ASTM D-882.

Additional features and advantages will be set forth in the detailed description which follows and will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary and are intended to provide an overview or framework to understanding the nature and character of the disclosure as it is claimed.

The accompanying drawings are included to provide a further understanding of principles of the disclosure, and are incorporated in, and constitute a part of, this specification. The drawings illustrate one or more embodiment(s) and, together with the description, serve to explain, by way of example, principles and operation of the disclosure. It is to be understood that various features of the disclosure disclosed in this specification and in the drawings can be used in any and all combinations. By way of non-limiting examples, the various features of the disclosure may be combined with one another according to the following aspects.

BRIEF DESCRIPTION OF THE DRAWINGS

These and other features, aspects and advantages of the present disclosure are better understood when the following detailed description of the disclosure is read with reference to the accompanying drawings, in which:

FIG. 3 is a schematic depicting an embodiment of a double pane window including a laminate, in accordance with various embodiments of the present disclosure.

FIG. 4 is a schematic depicting another embodiment of a triple pane window including a laminate, in accordance with various embodiments of the present disclosure.

DETAILED DESCRIPTION OF THE DRAWINGS

Figure 1:
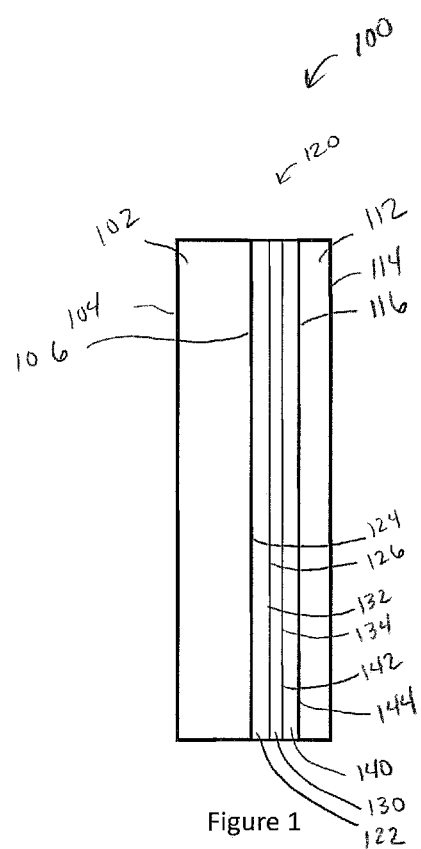
FIG. 1 is a schematic depicting an embodiment of a laminate, in accordance with various embodiments of the present disclosure.

In the following detailed description, for purposes of explanation and not limitation, example embodiments disclosing specific details are set forth to provide a thorough understanding of various principles of the present disclosure. However, it will be apparent to one having ordinary skill in the art, having had the benefit of the present disclosure, that the present disclosure may be practiced in other embodiments that depart from the specific details disclosed herein. Moreover, descriptions of well-known devices, methods and materials may be omitted so as not to obscure the description of various principles of the present disclosure. Finally, wherever applicable, like reference numerals refer to like elements.

Referring to FIG. 1, a laminate 100 is shown, having a multi-layered interlayer 120. The laminate 100 has a first glass layer 102 having a first side 104 and a second side 106 and a second glass layer 112 having a first side 114 and a second side 116. Positioned between the first glass layer and the second glass layer is the interlayer 120, which includes a first low modulus material layer (e.g. TPU layer, EVA layer, or PVB layer) 122 (having a first side 124 and second side 126); a polymer core layer 130 (having a first side 132 and a second side 134), and a second low modulus material layer (e.g. TPU layer, EVA layer, or PVB layer) 140 (having a first side 142 and a second side 144). The first side 124 of the first low modulus material layer 122 is positioned adjacent to the second side 106 of the first glass layer 102. The second side 144 of the second low modulus material layer 140 is positioned adjacent to the second side 116 of the second glass layer 112. The first side 132 of the core polymer layer 130 is positioned adjacent to the second side 126 of the first low modulus material layer 122. The second side 134 of the polymer layer 130 is positioned adjacent to the first side 142 of the second low modulus material layer 140. FIG. 1 depicts a monolithic laminate, in that each of the layers: first glass layer 102, first low modulus material layer 122; core polymer layer 130; second low modulus material layer 140; and second glass layer 112 are adhered together in an integral form (e.g. optically transparent).

Figure 2:
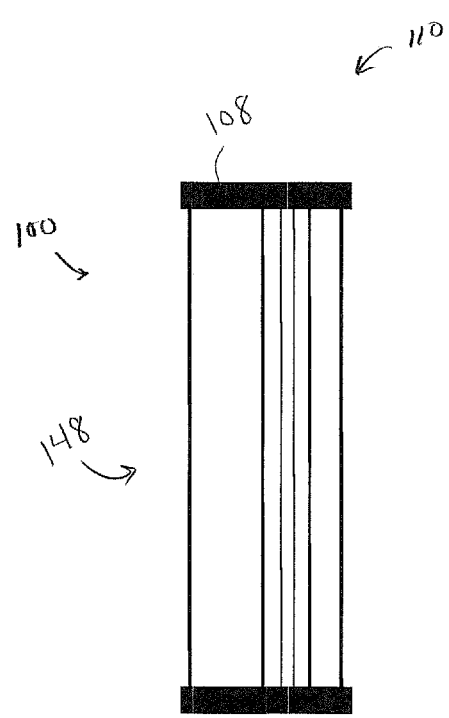
FIG. 2 is a schematic depicting an embodiment of a single glazing window including a laminate including a frame, in accordance with various embodiments of the present disclosure.

FIG. 2 depicts a laminate 100 having the configuration described in FIG. 1, configured as a window 110. As shown in FIG. 2, the window is a single glazing having a first pane 148 retained (e.g. along its perimetrical edge) in a frame 108.

FIG. 3 depicts a laminate 100 having the configuration described in FIG. 1, configured as a window 110. As shown in FIG. 2, the window is a double pane window having a first pane 148 and a second pane 128. The first pane 148 is a laminate 100. The first pane 148 and second pane 128 are configured in spaced relation from one another with a seal member 118 configured between the panes (e.g. along or adjacent to a perimetrical edge). In this configuration, an air gap 150 is defined between the seal member 118, first pane 148 and second pane 128. Various gases (e.g. insulating gases) can be configured in the defined air gap 150.

FIG. 4 depicts a laminate 100 having the configuration described in FIG. 1, configured as a window 110. As shown in FIG. 4, the window is a triple pane window having a first pane 148, a second pane 128, and a third pane 136. The first pane 148 is a laminate 100. The first pane 148, second pane 128, and third pane 136 are configured in spaced relation from one another with a seal member 118 configured between the panes (e.g. along or adjacent to a perimetrical edge). In this configuration, an air gap 150 is defined between the seal member 118, first pane 148 and second pane 128 and an air gap 152 is defined between the seal member 118, the second pane 128, and the third pane 136. Various gases (e.g. insulating gases) can be configured in the defined air gap 150 and defined air gap 152.

Figure 5:
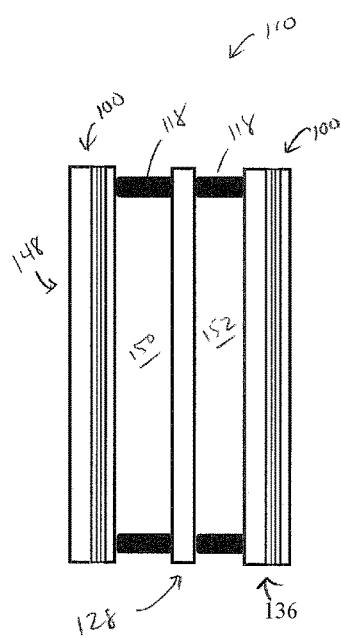
FIG. 5 is a schematic depicting an embodiment of a triple pane window including two laminates, positioned as first pane and third pane, in accordance with various embodiments of the present disclosure.

FIG. 5 depicts an alternative embodiment for a triple pane window 100 having a laminate 100 as the first pane 148 and a laminate as the third pane 138, where the laminate is as described in FIG. 1 and the triple pane window is as otherwise described in FIG. 4.

Figure 6:
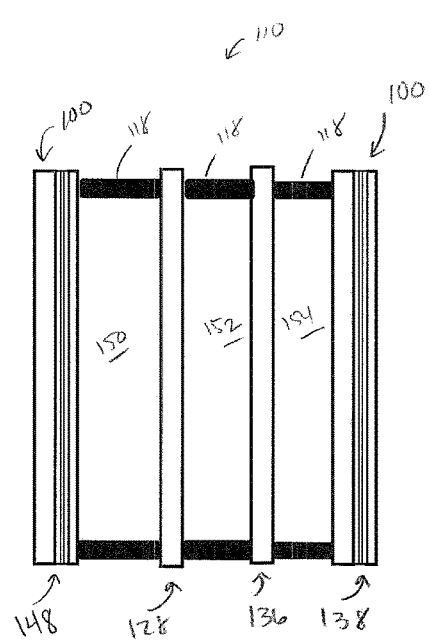
FIG. 6 is a schematic depicting an embodiment of a quadruple pane window including two laminates, positioned as first pane and fourth pane, in accordance with various embodiments of the present disclosure

FIG. 6 depicts a laminate 100 having the configuration described in FIG. 1, configured as a window 110. As shown in FIG. 5, the window is a quadruple pane window having a first pane 148, a second pane 128, a third pane 136, and a fourth pane 138. The first pane 148 is a laminate 100 and the fourth pane 138 is a laminate 100. The first pane 148, the second pane 128, the third pane 136, and the fourth pane 138 are configured in spaced relation from one another with a seal member 118 configured between first pane 148 and second pane 128, second pane 128 and third pane 136, and third pane 136 and fourth pane 138 (e.g. along or adjacent to a perimetrical edge). In this configuration, an air gap 150 is defined between the seal member 118, first pane 148 and second pane 128; an air gap 152 is defined between the seal member 118, the second pane 126, and the third pane 136; and an air gap 154 is defined between the seal member 118, the third pane 136 and the fourth pane 138. Various gases (e.g. insulating gases) can be configured in the defined air gap 150, the defined air gap 152, and the air gap 154.

Figure 7:
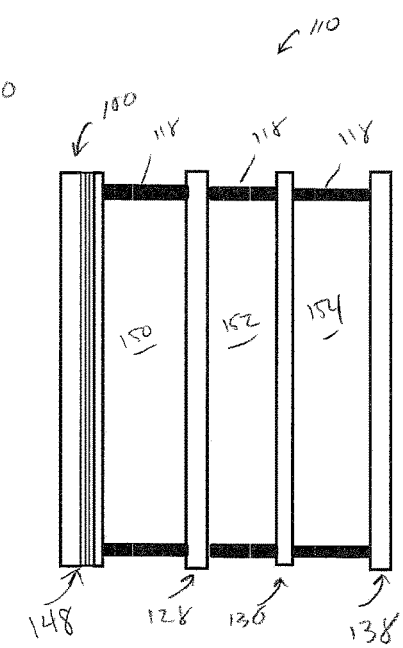
FIG. 7 is a schematic depicting another embodiment of a quadruple pane window including a laminate, in accordance with various embodiments of the present disclosure

FIG. 7 depicts an alternative embodiment for a quadruple pane window 100 having a laminate 100 as the first pane 148, where the laminate is as described in FIG. 1 and the quadruple pane window is as otherwise described in FIG. 6.

Figure 8:
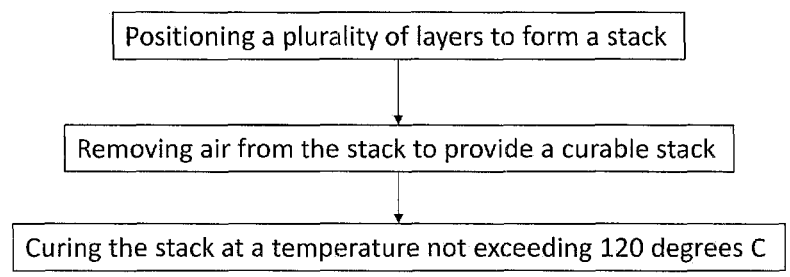
FIG. 8 is a flow chart depicting an embodiment of a method of making a laminate in accordance with various embodiments of the present disclosure.

FIG. 8 provides an example method of making a laminate, in which a plurality of layers is configured together in adjacent relation to form a stack; removing air from the stack to form a curable stack; and curing the stack at a low temperature (e.g. less than 130 degrees C., less than 120 degrees C., less than 110 degrees C., or at 100 degrees C.).

Figure 9:
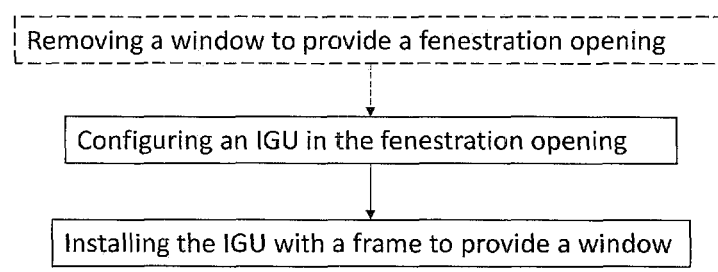
FIG. 9 is a flow chart depicting a method of installing a window having a laminate, in accordance with various embodiments of the present disclosure.

FIG. 9 provides an example method of installing a window in accordance with one or more embodiments set forth herein, including configuring the IGU (window) in a fenestration opening and installing the IGU with a frame to provide an installed window. Also set out in FIG. 9 is the option for retrofit installation, in which the existing window is removed from a building to provide a fenestration opening, leaving an opening for the new window installation.

Example: Evaluation of Laminate Construction and Bow Measurement

In order to evaluate the interlayer configuration's effect on bow mitigation, an experiment was performed where five laminates were constructed and bow in the resulting laminate was measured in two directions: (1) in the diagonal across the laminate and (2) along the long edge of the laminate.

There were a total of four (4) embodiments evaluated against the control, having varying thicknesses of the first & second low modulus material layer (i.e. first TPU layer vs. the second TPU layer). The experiment utilized uniform thicknesses for various components: the first layer (soda lime glass) had a thickness of 2.1 mm; the second layer (an alkaline earth boro-aluminosilicate glass) had a thickness of 0.7 mm; and the core polymer layer (PET for embodiments A-D) had a thickness of 0.178 mm.

The same method of lamination was utilized to process all samples, in that the interlayer(s) were positioned between the two layers of glass. Air was removed via vacuum (other acceptable methods of air removal include nip rolling). Then, the interlayer was cured at elevated temperature.

The five resulting laminates, each having the same size of 1100×900 mm, were evaluated for bow (1) in the diagonal across the laminate and (2) along the long edge of the laminate.

Bow was measured in accordance with ASTM C1172. More specifically, each sample was placed in a free-standing vertical position, with the longest edge resting on blocks at the quarter points. With the laminate in this position, a straightedge is then placed across the concave surface, parallel to and within 1 in. (25.4 mm) of the edge, and the maximum deviation was measured with a dial indicator. With the laminate in this position, a straightedge is then placed across the concave surface, from generally opposing corners across the diagonal of the sample, and the maximum deviation was measured with a dial indicator (diagonal bow).

The table below provides the resulting bow measurements for each of the laminates.

| Sample Description | First layer Thickness, mm | Interlayer Type/ Thickness (mm) | Second layer Thickness, (mm) | Post-Lam Diagonal Bow (mm) | Post-Lam Long Edge Bow (mm) | % Bow reduction vs. Control (avg. vs. avg. control) |
|---|---|---|---|---|---|---|
| Control (non-invention) | 2.1 | PVB/2.29 | 0.7 | 4.58 | 4.23 | Control, N/A |
| Embodiment A | 2.1 | TPU 1.91 PET 0.178 TPU 0.38 | 0.7 | 1.04 | 1.08 | 75.9% |
| Embodiment B | 2.1 | TPU 1.27 PET 0.178 TPU 1.02 | 0.7 | 0.75 | 0.80 | 82.3% |
| Embodiment C | 2.1 | TPU 1.02 PET 0.178 TPU 1.27 | 0.7 | 1.11 | 1.29 | 72.8% |
| Embodiment D | 2.1 | TPU 0.38 PET 0.178 TPU 1.91 | 0.7 | 0.86 | 0.94 | 79.6% |

As shown in the table above, all embodiments significantly outperformed the control. Under identical processing conditions, the embodiments demonstrate about four to five times less bow compared with an approximately equal thickness of PVB. In evaluating the average bow for each sample, and in comparing the average bow of each embodiment to the bow box of the control, it's shown in the table above that all embodiments had at least a 70% improvement in bow, to over 80% improvement in bow achievable (e.g. embodiment B), as compared to the control. Three of the four embodiments (A, B, and D) measured at least a 75% reduction in bow as compared to the control, a significant improvement. Based on the four positions of the core layer in the interlayer, and proximity of the core layer to the first layer or second layer of the laminate, there did not appear to be any adverse impact on the bow mitigation of the laminate configuration.

Many variations and modifications may be made to the above-described embodiments of the disclosure without departing substantially from the spirit and various principles of the disclosure. All such modifications and variations are intended to be included herein within the scope of this disclosure and protected by the following claims.

What is claimed is:

1. A laminate glass article, comprising:
   a first layer of a first transparent or translucent material, the first sheet having a thickness and a first coefficient of thermal expansion (CTE) measured over a range of from 0-300° C.;
   a second layer of a second transparent or translucent material, the second sheet having a thickness and a second CTE; and an interlayer between the first layer and the second layer, wherein the interlayer is adhered between the first layer and the second layer; wherein the interlayer comprises a plurality of polymer layers, including:
a polymer core layer comprising a high modulus polymer material; and
a first low modulus material layer configured between the first layer and the polymer core layer; and
a second low modulus material layer configured between the second layer and the polymer core layer, the first low modulus material and the second low modulus material having a modulus lower than that of the high modulus polymer material,
wherein the first low modulus material layer has a first thickness, the second low modulus material layer has a second thickness, and the polymer core layer has a third thickness that is less than at least one of the first thickness and the second thickness.

2. The laminate glass article of claim 1, wherein the interlayer has a thickness of not greater than 2.5 mm.

3. The laminate glass article of claim 1, wherein an article surface area of at least 3 feet by 5 feet comprises of a bow of not greater than 3 mm/m when measured in accordance with ASTM C1172.

4. The laminate glass article of claim 1, wherein the high modulus polymer material is selected from the group consisting of: polyethylene terephthalate, polycarbonate, polyacrylate, polyimide, and combinations thereof.

5. The laminate glass article of claim 1, wherein the first low modulus material layer and second low modulus material layer are selected from the group consisting of: TPU, PVB, EVA, and combinations thereof.

6. The laminate glass article of claim 1, wherein the first CTE is greater than the second CTE.

7. The laminate glass article of claim 1, wherein the first CTE is 2.5 times greater than the second CTE.

8. The laminate glass article of claim 1, wherein the first CTE is greater than $75 \times 10^{-7}/° C$.

9. The laminate glass article of claim 1, wherein the second CTE is less than $60 \times 10^{-7}/° C$.

10. The laminate glass article of claim 1, wherein the thickness of the first layer is greater than the thickness of the second layer.

11. The laminate glass article of claim 1, wherein the second layer comprises a thickness of not greater than 1 mm.

12. The laminate glass article of claim 1, wherein the second layer comprises a thickness in the range from 0.3 mm to 1 mm.

13. The laminate glass article of claim 1, wherein the first layer is a soda lime silicate glass.

14. The laminate glass article of claim 1, wherein the second layer is an inorganic glass.

15. The laminate glass article of claim 1, wherein the second layer is an alkaline earth boro-aluminosilicate glass.

16. The laminate glass article of claim 1, wherein the interlayer comprises a thickness of 0.76 mm to 2.3 mm.

17. The laminate glass article of claim 1, wherein the third thickness of the polymer core layer is not greater than the thickness of the second layer.

18. The laminate glass article of claim 1, wherein the third thickness of the polymer core layer is not greater than half of the thickness of the second layer.

19. The laminate glass article of claim 1, wherein the first low modulus material layer and the second low modulus material layer are selected from the following thicknesses: 0.38 mm, 0.635 mm, 0.76 mm, and 1.27 mm.

20. The laminate glass article of claim 1, wherein the third thickness of the polymer core layer is selected from the group consisting of: 0.025 mm, 0.051 mm, 0.076 mm, 0.102 mm, 0.127 mm, and 0.178 mm.

* * * * *